United States Patent [19]
Sugiyama

[11] Patent Number: 5,839,083
[45] Date of Patent: Nov. 17, 1998

[54] GEAR SHIFT CONTROL DEVICE OF AUTOMATIC TRANSMISSION WITH ESTIMATION OF TIRE GRIP LIMIT

[75] Inventor: Mizuho Sugiyama, Toyota, Japan

[73] Assignee: Toyota Jidosha Kabushiki Kaisha, Toyota, Japan

[21] Appl. No.: 825,621

[22] Filed: Mar. 31, 1997

[30] Foreign Application Priority Data

May 10, 1996 [JP] Japan ..................................... 8-141088

[51] Int. Cl.$^6$ ....................................................... G06G 7/70
[52] U.S. Cl. ............................... 701/62; 701/95; 701/74; 701/90; 701/65; 477/49; 477/115
[58] Field of Search .................................. 701/69, 70, 71, 701/72, 76, 82, 84, 90, 92, 95, 97, 51, 53, 54, 62, 64, 65, 74; 180/197, 412, 446, 282; 303/145, 146, 140; 477/49, 156, 44, 115, 125, 78, 143, 154

[56] References Cited

U.S. PATENT DOCUMENTS

| | | | |
|---|---|---|---|
| 4,901,811 | 2/1990 | Uno et al. | 180/414 |
| 5,029,493 | 7/1991 | Takada et al. | 477/156 |
| 5,676,433 | 10/1997 | Inagaki et al. | 701/72 |
| 5,679,092 | 10/1997 | Otsubo et al. | 701/65 |
| 5,704,695 | 1/1998 | Monzaki et al. | 701/72 |
| 5,717,591 | 2/1998 | Okada et al. | 701/72 |

FOREIGN PATENT DOCUMENTS

| | | |
|---|---|---|
| 62-71729 | 4/1987 | Japan . |
| 2-80858 | 3/1990 | Japan . |
| 4-54370 | 2/1992 | Japan . |

Primary Examiner—Jacques H. Louis Jacques
Attorney, Agent, or Firm—Oliff & Berridge, PLC

[57] ABSTRACT

A gear shift control device of an automatic transmission of a vehicle, including: a means for estimating a target shift stage for harmonizing rotation speed and power output of engine of the vehicle; a means for estimating slip angle of at least one of the pair of drive wheels; a means for estimating slip ratio of the at least one drive wheel which would be caused thereon by the automatic transmission being shifted to the target shift stage; a means for estimating tire grip of the at least one drive wheel based upon the estimated slip angle and the estimated slip ratio; a means for judging if the estimated tire grip of the at least one drive wheel is in a grip range predetermined therefor; and a means for executing gear shift of the automatic transmission when the target shift stage is different from a current shift stage with the estimated tire grip being within the predetermined grip range.

3 Claims, 5 Drawing Sheets

GEAR SHIFT CONTROL DEVICE OF AUTOMATIC TRANSMISSION WITH ESTIMATION OF TIRE GRIP LIMIT

BACKGROUND OF THE INVENTION

1. Field of the Invention

The present invention relates to a gear shift control of an automatic transmission of a vehicle, and more particularly, to an improvement of a gear shift control of an automatic transmission from the point of view of ensuring running stability of the vehicle.

2. Description of the Prior Art

The automatic transmission of vehicles is generally controlled by a gear shift control device so as to be shifted among a plurality of shift stages according to a comparison of engine throttle opening versus vehicle speed such that, when the vehicle is started from standstill and gradually accelerated, the automatic transmission is successively shifted up to a higher shift stage according to a relative increase of the vehicle speed against the throttle opening, or when the vehicle is decelerated from a high speed running state, the automatic transmission is successively shifted down to a lower shift stage according to a relative reduction of the vehicle speed against the throttle opening. When the transmission is shifted down to a shift stage where an engine braking is available during deceleration of the vehicle or the transmission is shifted down by an abrupt deep depression of the accelerator pedal for a quick acceleration, the drive wheel of the vehicle is liable to substantially slip against the road surface. As well known in the art, when a side force is acting at the drive wheel as in a condition where the vehicle is making a turn, the longitudinal slip of the drive wheel caused by the high rated deceleration or acceleration substantially affects the grip limit of the tire of the drive wheel to the road surface, because the force which would slide the drive wheel along the road surface is the vector addition of a lateral force acting at the drive wheel due to a centrifugal force generated in the turning vehicle and a longitudinal force acting at the drive wheel corresponding to the longitudinal slip. In view of such a phenomenon, in Japanese Patent Laid-open Publication 4-54370 it was proposed to prohibit downshifting of the automatic transmission during a turn running of the vehicle, the prohibition of downshifting being dissolved when the vehicle has resumed a straight running and a target shift stage estimated thereon is equal to or higher than a current shift stage.

SUMMARY OF THE INVENTION

Considering, however, that the automatic gear shifting of the automatic transmission based upon its own gear shifting schedule, particularly the downshifting so determined thereby, is still to be respected for harmonizing rotation speed and power output of the engine for an even better power performance of the vehicle, it is a primary object of the present invention to more critically restrict the prohibition of the gear shifting of the automatic transmission, without adversely affecting the running stability of the vehicle during a turn running.

In order to accomplish such an object, the present invention proposes a gear shift control device of an automatic transmission of a vehicle having an engine, a pair of drive wheels and a pair of driven wheels, comprising:

a means for estimating a target shift stage for harmonizing rotation speed and power output of the engine;

a means for estimating slip angle of at least one of the pair of drive wheels;

a means for estimating slip ratio of said at least one drive wheel which would be caused thereon by the automatic transmission being shifted to said target shift stage;

a means for estimating tire grip of said at least one drive wheel based upon said estimated slip angle and said estimated slip ratio;

a means for judging if said estimated tire grip of said at least one drive wheel is in a grip range predetermined therefor; and a means for executing gear shift of the automatic transmission when said target shift stage is different from a current shift stage with said estimated tire grip being within said predetermined grip range.

By the gear shifting of the automatic transmission being allowed up to such a limit that the tire grip of at least one drive wheel which is essential for holding the running stability of the vehicle does not come out of a grip range predetermined to be critical for ensuring the vehicle against undesirable running instability, the improvement of the power performance of the vehicle available by the automatic gear shifting of the automatic transmission can be exhibited effectively with a critical compromise with securement of the turn running stability of the vehicle.

In the gear shift control device of the above-mentioned construction, said predetermined grip range may be an area defined inside of an ellipse in a coordinate system of abscissa and ordinate providing a coordination of slip angle and slip ratio of said at least one drive wheel, said ellipse having a first radius along one of the abscissa and the ordinate and a second radius along the other of the abscissa and the ordinate, said first radius being such a value of slip angle considered to be a maximum allowable for said at least one drive wheel when the slip ratio thereof is zero, said second radius being such a value of slip ratio considered to be a maximum allowable for said at least one drive wheel when the slip angle thereof is zero.

The gear shift control device of the above-mentioned construction may be incorporated into the vehicle which comprises a means for selectively prohibiting gear shift of the automatic transmission for the purpose of running stability control of the vehicle, with a modification that said gear shift control device further comprises a means for canceling gear shift prohibition by said gear shift prohibition means when said target shift stage is different from a current shift stage with said estimated tire grip being within said predetermined grip range.

BRIEF DESCRIPTION OF THE DRAWINGS

In the accompanying drawings.

DESCRIPTION OF THE PREFERRED EMBODIMENTS

In the following, the present invention will be described in more detail with respect to some preferred embodiments with reference to the accompanying drawings.

Figure 1:
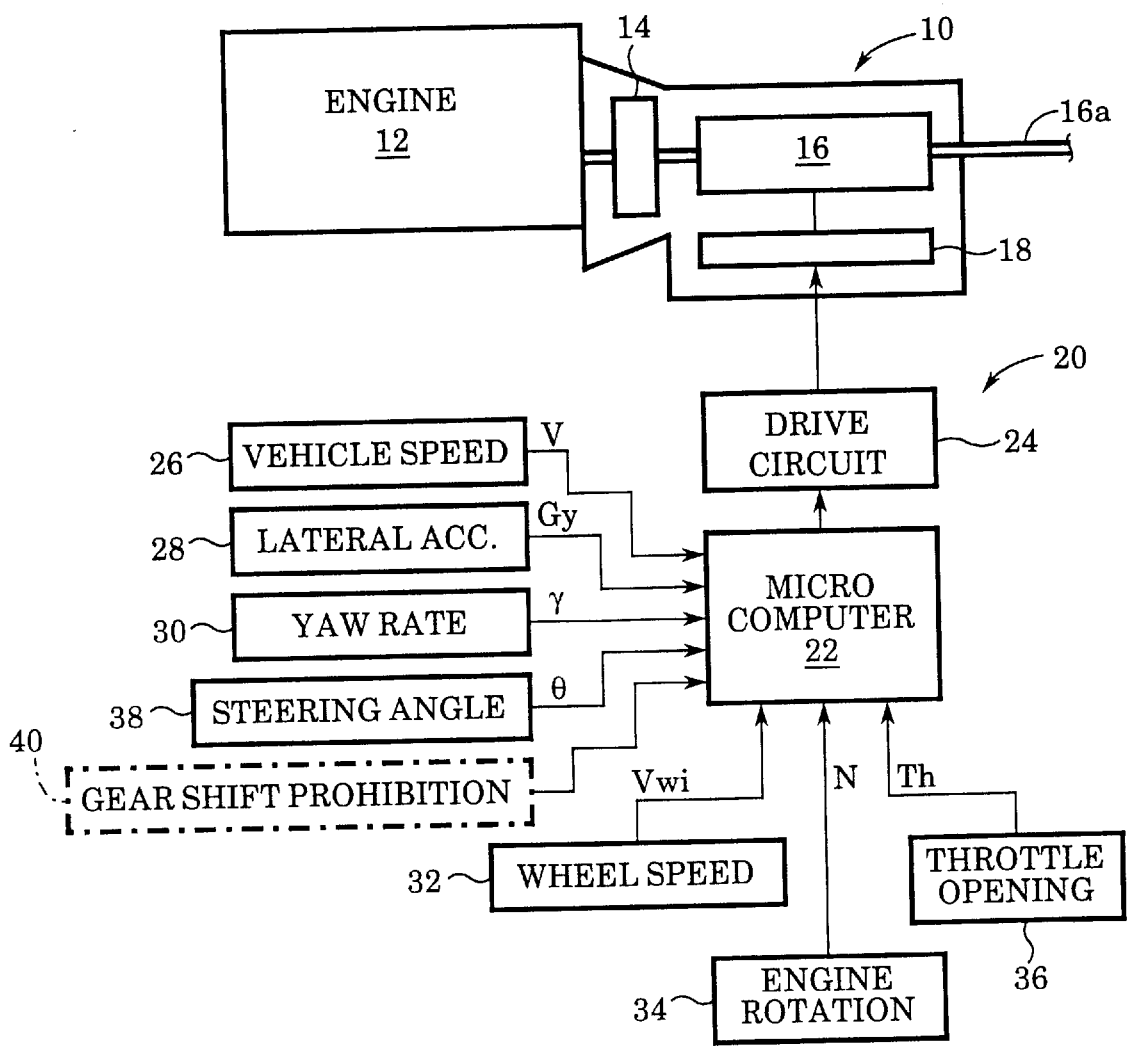
FIG. 1 is a diagrammatical illustration of an embodiment of the gear shift control device according to the present invention, shown as assembled to an automatic transmission of a vehicle (not shown) and supplied with data of various parameters available in a modern vehicle equipped with a running stability control system.

Referring to FIG. 1, an automatic transmission generally designated by 10 is assembled to an engine 12 of a vehicle such as an automobile not shown in the figure, the vehicle having a pair of drive wheels, a pair of driven wheels and a vehicle body suspended thereby, as quite well known in the art. The automatic transmission 10 includes a torque converter 14 of a conventional type, a changeover gear mechanism 16 having an output shaft 16a connected with the pair of drive wheels via a differential gear of a conventional construction not shown in the figure, and a hydraulic circuit means 18 for changing over the gear mechanism 16. The hydraulic circuit means 18 includes a plurality of solenoid valves adapted to be controlled by electric signals. Such an overall construction of the automatic transmission 10 is well known in the art in various types, as shown, for example, in U.S. Pat. No. 5,029,493 assigned to the same assignee as the present application.

The gear shift control device according to the present invention is indicated by 20 and includes a microcomputer 22 and a drive circuit 24. The microcomputer 22 may be of an ordinary construction including central processing unit, read only memory, random access memory, input and output port means, and common bus interconnecting those elements. The drive circuit 24 is adapted to generate electric currents for operating the solenoid valves of the hydraulic circuit means 18 based upon electronic control signals generated by the microcomputer 22.

The microcomputer 22 is supplied with signals representing vehicle speed V from a vehicle speed sensor 26, lateral acceleration Gy acting at the vehicle body from a lateral acceleration sensor 28, yaw rate γ of the vehicle body from a yaw rate sensor 30, vehicle speed Vwi (i=fl, fr, rl, rr) of front left, front right, rear left and rear right wheels from wheel speed sensors 32, engine rotation speed N from an engine rotation sensor 34, throttle opening Th from a throttle opening sensor 36, and steering angle θ of a steering wheel not shown in the figure from a steering angle sensor 38 as a set of basic data. Further, for the operation of a modification of the gear shift control device of the present invention, a signal instructing to prohibit gear shifting generated by a gear shift prohibition means 40 is supplied to the microcomputer 22 such that the gear shift prohibition control by the gear shift prohibition means 40 is effected through the gear shift control device 20 of the present invention.

The construction of the gear shift control device 20 of the present invention will be described in the form of its control operation, because the construction of the device is essentially a software construction incorporated in the microcomputer 22.

Figure 2:
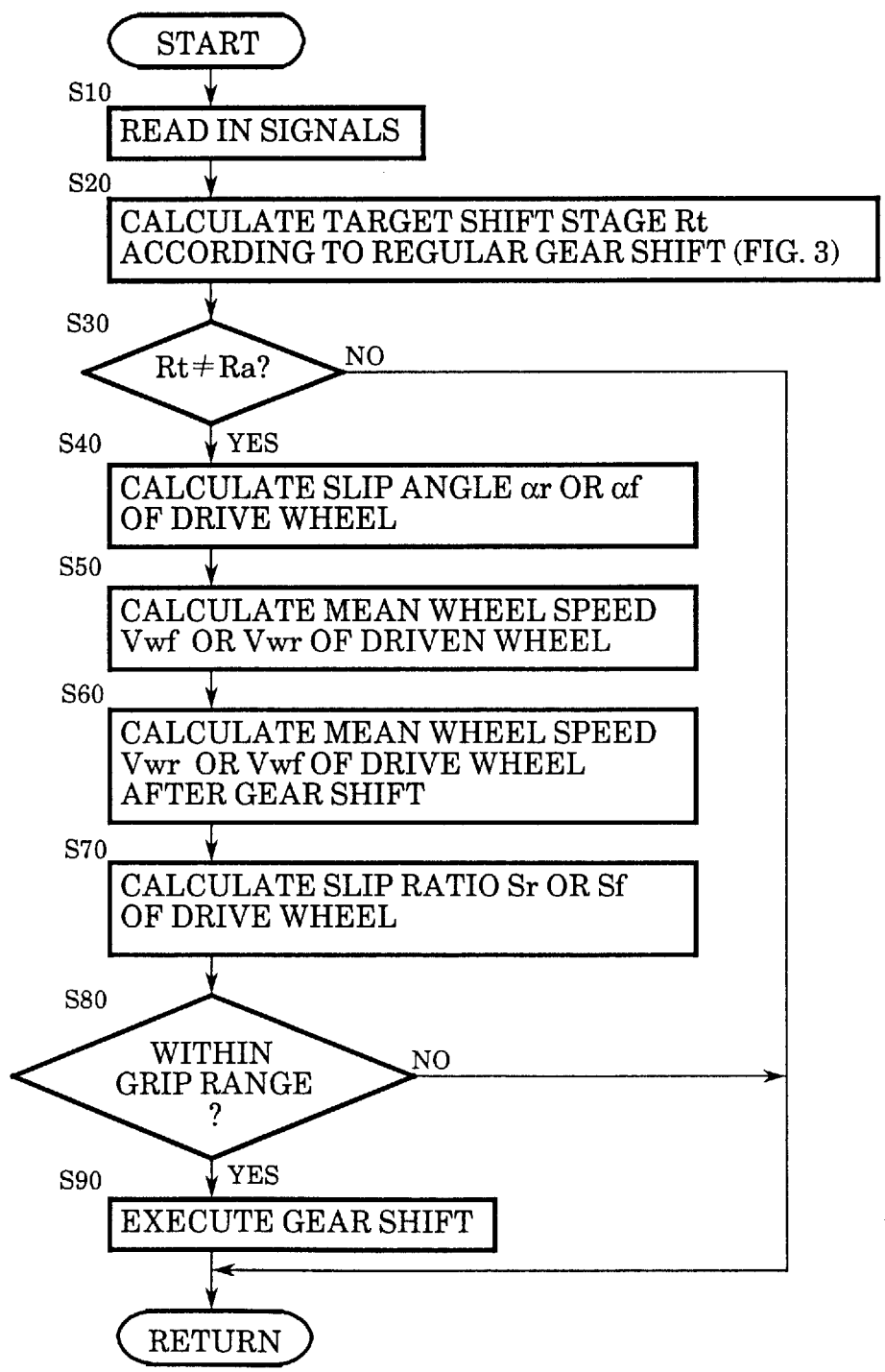
FIG. 2 is a flowchart showing a basic operation of the gear shift control device according to the present invention.

FIG. 2 shows the basic operation of the gear shift control device 20 in the form of a flowchart. The operation according to this flowchart is started with a closure of an ignition switch of the vehicle not shown in the figure, and is cyclically repeated at a cycle such as tens of microseconds until the ignition switch is opened.

When the control operation is started, in step 10, signals such as V, etc. are read in.

Figure 3:
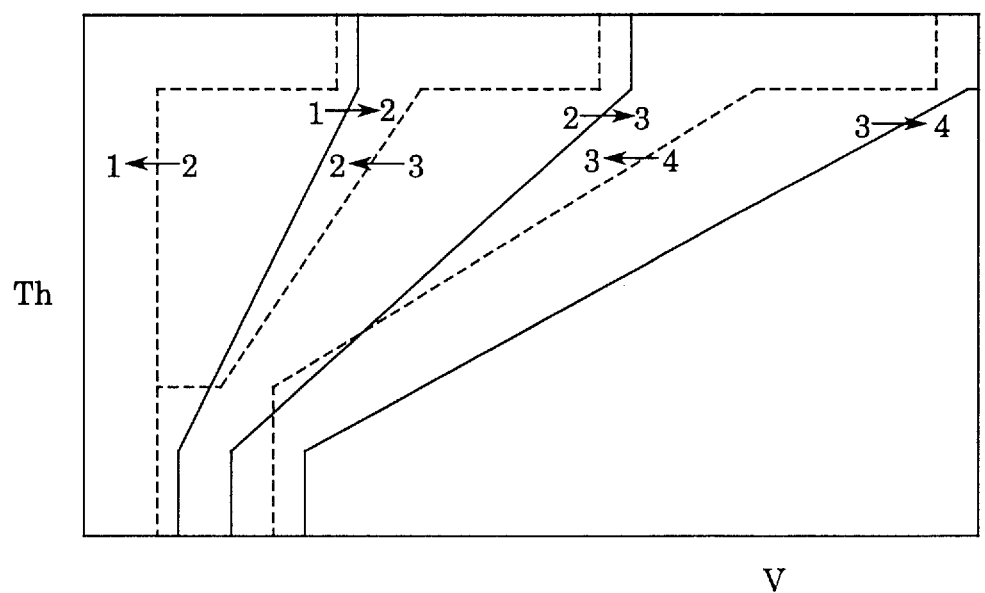
FIG. 3 is a diagram showing a general example of gear shifting schedule of the automatic transmission of a vehicle.

In step 20, based upon the read in values of vehicle speed V and throttle opening Th, by referring to a regular gear shift schedule such as shown as a map in FIG. 3, the microcomputer 22 calculates a target shift stage Rt which is to be set up for each instant current contrast of V vs. Th. The gear shift schedule shown in FIG. 3 is an example of those well known in the art. As well known in the art, when the target shift stage Rt, i.e. target point of V vs. Th, is on the right side of the current point of V vs. Th across any of 1→2, 2→3 and 3→4 upshift lines, the transmission is to be shifted up across the corresponding upshift line according to the conventional regular gear shifting, while if the target shift stage Rt is on the left side of the current shift stage across any of 1←2, 2←3 and 3←4 downshift lines, the transmission is to be shifted down across the corresponding downshift line according to the conventional regular gear shifting.

So in step 30, the target shift stage Rt is compared with the current shift stage Ra to check if the former is different from the latter across any of the upshift lines or the downshift lines. If the answer is no, the control proceeds to return, bypassing the subsequent steps, while if the answer is yes, the control proceeds to step 40.

In step 40, the microcomputer 22 calculates slip angle αr of drive wheel with respect to at least one of the pair of rear wheels when the vehicle is a rear drive vehicle, or slip angle αf of drive wheel with respect to at least one of the pair of front wheels when the vehicle is a front drive vehicle, as follows:

First, difference between the lateral acceleration Gy of the vehicle body detected by the lateral acceleration sensor 28 and a product of the vehicle speed V detected by the vehicle speed sensor 26 and the yaw rate γ of the vehicle body detected by the yaw rate sensor 30 is calculated such as Gy−V×γ, then the difference is integrated on time basis to produce side slide velocity Vy of the vehicle, and then the side slide velocity Vy is divided by longitudinal velocity Vx of the vehicle (may be substituted for by the vehicle speed V detected by the vehicle speed sensor 26) to produce slip angle β of the vehicle body (more precisely, the slip angle of the vehicle body at its center of gravity).

Then, in the case of a rear drive vehicle, denoting longitudinal distance between a rear axle and the center of gravity of the vehicle body as Lr, slip angle of the rear wheels is calculated as follows:

$$\alpha r = -Lr \times \gamma / V$$

Since in a usual rear drive vehicle the pair of rear drive wheels are not steered, αr calculated as above may be applied to both of the pair of rear wheels, one serving at the inside of a turn and the other serving at the outside of the turn, with no particular compensation for the difference in the radius of curvature between the opposite sides wheels.

In the case of a front drive vehicle, denoting longitudinal distance between a front axle and the center of gravity of the vehicle body as Lf and steering angle of the front wheel with respect to at least one of the pair of front drive wheels as δ, the slip angle αf of the one front drive wheel is calculated as follows:

$$\alpha f = \delta - \beta - Lf \times \gamma / V$$

In a usual front drive vehicle, the front wheels are also steering vehicle wheels. The steering angle of the front wheel serving at the inside of a turn is generally made greater than that of the front wheel serving at the outside of the turn to compensate for the difference in the radius of curvature traced by the front wheel serving at the inside and that serving at the outside of the turn. Therefore, the angle δ in the above equation converted from the turning angle θ of the steering wheel detected by the sensor 38 is different according to whether the slip angle αf is calculated with respect to the front wheel serving at the inside of a turn or the front wheel serving at the outside of the turn. In this connection, considering that the vertical load on the wheels is shifted from the wheel serving at the inside of a turn to the wheel serving at the outside of the turn under the influence of the centrifugal force, and that the tire grip against the load surface is generally proportional to the vertical load on the wheel, thereby rendering the wheel serving at the inside of the turn to be more liable to saturation of the tire grip than the wheel serving at the outside of the turn, for a more stable operation of the vehicle, it will be desirable that the slip angle δ is made the steering angle of the front wheel serving at the inside of the turn, so that the critical control by the gear shift control device according to the present invention is applied to the front wheel serving at the inside of the turn. Therefore, in the context of the present specification, the above-mentioned at least one drive wheel is to be primarily understood, not for limiting, to indicate the drive wheel serving at the inside of the turn, particularly when the drive wheels are the front wheels.

In step 50, mean wheel speed of the driven wheels is calculated as follows:

$$Vwf = (Vwfl + Vwfr)/2 \text{ (for rear drive vehicle)}$$

$$Vwr = (Vwrl + Vwrr)/2 \text{ (for front drive vehicle)}$$

In step 60, wheel speed which the drive wheel would show when the transmission was shifted to the target shift stage Rt under the current rotation speed of the engine is calculated based upon reduction gear ratio Kt of the gear mechanism 16 corresponding to the target shift stage Rt, factor Kc representing reduction gear ratio of the differential gear and the engine rotation speed N, as follows:

$$Vwr \text{ or } Vwf = Kt \times Kc \times N$$

In step 70, slip ratio which the drive wheel would show when the transmission was shifted to the target shift stage Rt is calculated as follows:

$$Sr = (Vwr - Vwf)/Vwf \text{ (for rear drive vehicle)}$$

$$Sf = (Vwf - Vwr)/Vwr \text{ (for front drive vehicle)}$$

In step 80, it is judged if the vector addition of the slip angle and the slip ratio of the drive wheel is within a predetermined grip range, as follows:

$$\frac{\alpha r^2}{\alpha m^2} + \frac{Sr^2}{Sm^2} = 1 \text{ (for rear drive vehicle)}$$

$$\frac{\alpha f^2}{\alpha m^2} + \frac{Sf^2}{Sm^2} = 1 \text{ (for front drive vehicle)}$$

Figure 4A:
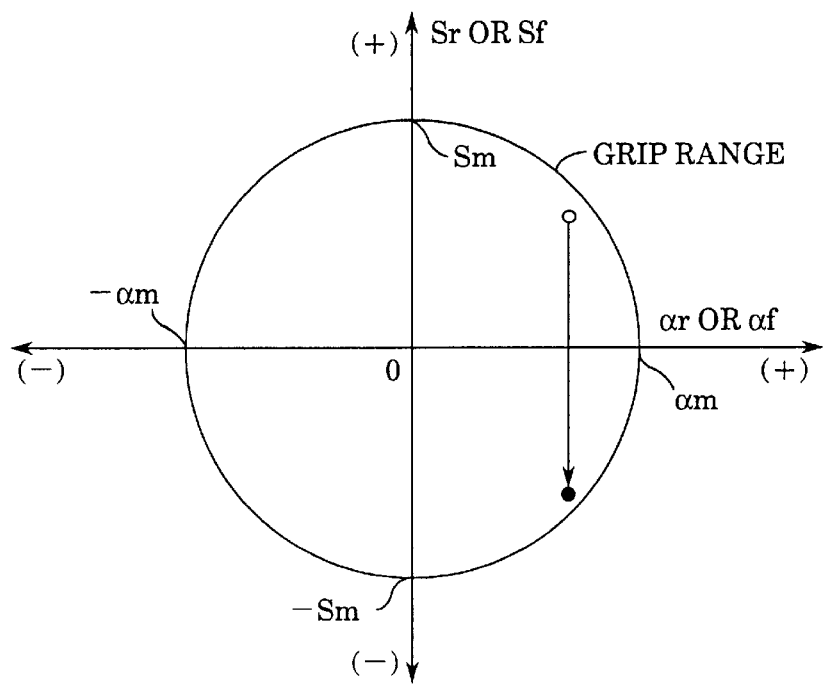
FIGS. 4A and 4B are diagrams showing examples of the relationship between a predetermined grip range of a drive wheel and a shifting of tire grip due to a change of slip ratio of the drive wheel.
Figure 4B:
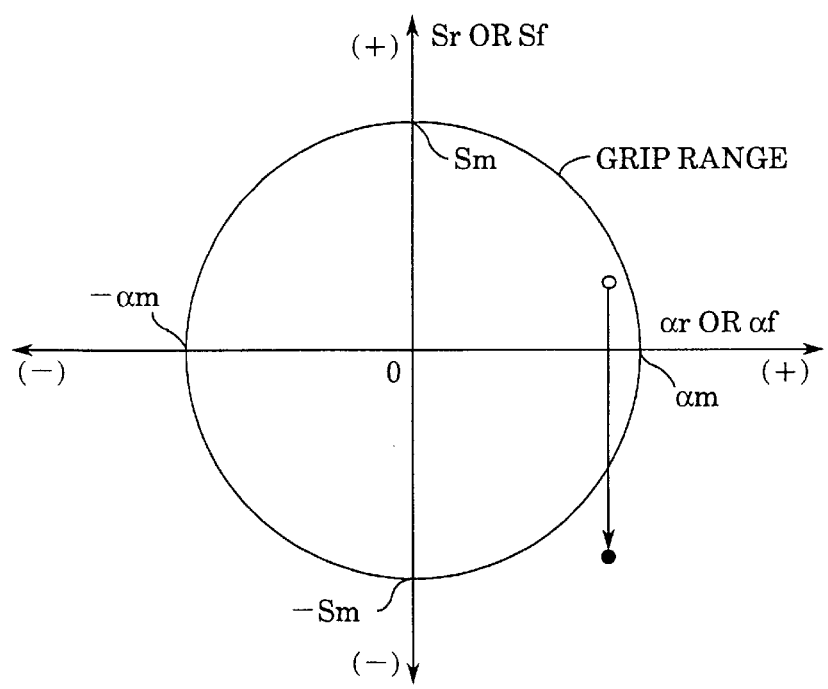

The relationship among αr and Sr or αf and Sf and αm and Sm are illustrated in FIGS. 4A and 4B. In these figures, an area defined by a circle therein shown defines the grip range according to the present invention, and is analogous to the "friction circle" known in the art as a circle representing an area in which the vector addition of lateral force and longitudinal force acting at a wheel is overcome or supported by the friction acting between the tire of the wheel and the road surface. In the case of the conventional friction circle, as the term indicates by itself, it is assumed that a wheel tire is frictionally held by a same value of force in all directions along the road surface, so that, when an area is defined on a coordinate system of abscissa representing the lateral force acting at the wheel and ordinate representing the longitudinal force acting at the wheel, the area in which the force due to the addition of the lateral force and the longitudinal force is overcome by the friction between the wheel tire and the road surface shows a circle having a constant radius in all directions. In this case, therefore, the unit of the abscissa and that of the ordinate are same with one another, i.e. "force". In contrast, in the case of the grip range according to the present invention, the unit of one of the abscissa and the ordinate forming a coordinate system thereof (in fact, the abscissa in the embodiment shown in FIGS. 4A and 4B) is the slip angle of the drive wheel, while the unit of the other of the abscissa and the ordinate (in fact, the ordinate in the embodiment shown in FIGS. 4A and 4B) is the slip ratio of the drive wheel.

Since the slip angle αr or αf of the drive wheel is generally proportional to the lateral force acting at the drive wheel until the tire grip thereof substantially saturates, while the slip ratio Sr or Sf is also generally proportional to the longitudinal force acting at the drive wheel until the tire grip thereof substantially saturates, if the slip angle αr or αf is converted into a corresponding lateral force with an appropriate first factor, while the slip ratio Sr or Sf is converted into a corresponding longitudinal force with an appropriate second factor, the grip range of the present invention could be replaced by the conventional friction circle. However, the difference of the present invention from the conventional art is the direct evaluation of the slip angle and the slip ratio of the drive wheel, so that the allowable maximum values αm and Sm with respect to the slip angle and the slip ratio may be each optionally determined to define an optimum grip range for even better harmony of the power performance and the running stability performance of a vehicle. Of course, the values of αm and Sm may be variably controlled according to various operating conditions of the vehicle such as road surface, tire performance, vehicle loading, etc.

The grip range according to the present invention directly defined by a coordinate system consisting of slip angle αr or αf and slip ratio Sr or Sf is fundamentally an elliptical area (though conveniently shown as a circle in FIGS. 4A and 4B) based upon the condition that the point on one of the abscissa and the ordinate (abscissa in the shown embodiment) indicated by αm shows a value of the slip angle considered to be a maximum allowable for the drive wheel when the slip ratio is zero, while the point on the other of the abscissa and the ordinate (ordinate in the shown embodiment) indicated by Sm shows a value of the slip ratio considered to be a maximum allowable for the drive wheel when the slip angle is zero.

Thus, if the answer of step 80 is yes, as exemplarily shown in FIG. 4A, wherein the white point represents the values of αr or αf and Sr or Sf according to the current shift stage Ra, while the black point represents the values of αr or αf and Sr or Sf which the drive wheel would show if the transmission was changed over from the current shift stage Ra to the calculated target shift stage Rt, with the black point being contained in the grip range, the control proceeds to step 90, so that gear shifting of the transmission to the target shift stage Rt is executed.

On the other hand, if the answer of step 80 is no, as exemplarily shown in FIG. 4B, wherein the black point comes out of the grip range, the control bypasses step 90, so that the gear shifting to the calculated target shift stage is not executed even when the target shift stage Rt was calculated to be different from the current shift stage, to avoid the turn running of the vehicle being rendered unstable by the gear shift of the transmission.

Figure 5:
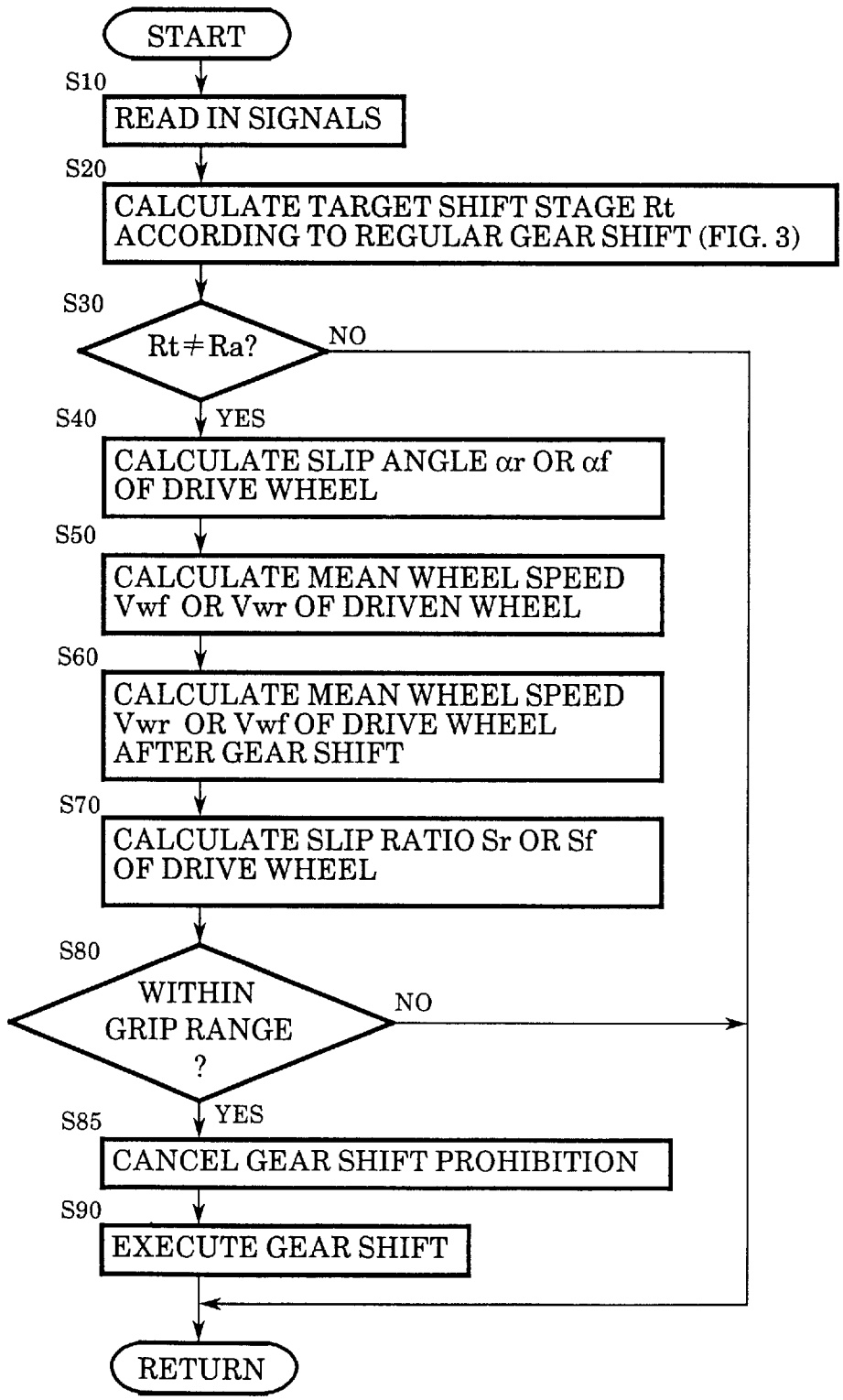
FIG. 5 is a flowchart similar to FIG. 2, showing a modification of the control operation.

FIG. 5 is a flowchart similar to FIG. 2, showing a modification of the control process of the gear shift control device of the present invention. The difference of the flowchart of FIG. 5 from that of FIG. 2 is only the incorporation of step 85 between steps 80 and 90. This modification is related with the incorporation of the gear shift prohibition means 40 shown in FIG. 1. As described in the introductory description of the specification with reference to Japanese Patent Laid-open Publication 4-54370, it is one of the known technical concepts in this art to prohibit gear shift of the automatic transmission according to a particular running condition of the vehicle such as a turning or the like. Such a control will have its own particular effects and advantages when operated according to various conditions for more stabilizing the running behavior of the vehicle. However, as long as the tire grip is concerned, when the present invention described with reference to FIGS. 2, 3, 4A and 4B is executed, the gear shift prohibition by such certain gear shift prohibition means may be temporarily canceled, if it is confirmed in step 80 of FIG. 2 or 5 that the tire grip is in the grip range critically predetermined as shown in FIG. 4A or 4B, so that the improvement of power performance of the vehicle available by an appropriate gear shift of the transmission is ensured without interfering with the running stability of the vehicle. In view of this, in the modification shown in FIG. 5, when the judgment of step 80 is yes, in step 85 the gear shift control device cancels the gear shift prohibition, even if instructed from the gear shift prohibition means 40, by the transmission control system being so modified that the gear shift prohibition instruction signal from the gear shift prohibition means 40 to the hydraulic circuit 18 is transmitted through the gear shift control device 20 of the present invention, so that the gear shift according to the target shift stage Rt is executed without being prohibited.

Although the present invention has been described in detail with respect to a preferred embodiment and a modification thereof, it will be apparent for those skilled in the art that other various modifications are possible within the scope of the present invention.

I claim:

1. A gear shift control device of an automatic transmission of a vehicle having an engine, a pair of drive wheels and a pair of driven wheels, comprising:

a means for estimating a target shift stage for harmonizing rotation speed and power output of the engine;

a means for estimating slip angle of at least one of the pair of drive wheels;

a means for estimating slip ratio of said at least one drive wheel which would be caused thereon by the automatic transmission being shifted to said target shift stage;

a means for estimating tire grip of said at least one drive wheel based upon said estimated slip angle and said estimated slip ratio;

a means for judging if said estimated tire grip of said at least one drive wheel is in a grip range predetermined therefor; and a means for executing gear shift of the automatic transmission when said target shift stage is different from a current shift stage with said estimated tire grip being within said predetermined grip range.

2. A gear shift control device according to claim 1, wherein said predetermined grip range is an area defined inside of an ellipse in a coordinate system of abscissa and ordinate providing a coordination of slip angle and slip ratio of said at least one drive wheel, said ellipse having a first radius along one of the abscissa and the ordinate and a second radius along the other of the abscissa and the ordinate, said first radius being such a value of slip angle considered to be a maximum allowable for said at least one drive wheel when the slip ratio thereof is zero, said second radius being such a value of slip ratio considered to be a maximum allowable for said at least one drive wheel when the slip angle thereof is zero.

3. A gear shift control device according to claim 1, wherein the vehicle comprises a means for selectively prohibiting gear shift of the automatic transmission for the purpose of running stability control of the vehicle, said gear shift control device further comprising a means for canceling gear shift prohibition by said gear shift prohibition means when said target shift stage is different from a current shift stage with said estimated tire grip being within said predetermined grip range.

* * * * *